United States Patent [19]

Sandstrom

[11] 4,443,279

[45] Apr. 17, 1984

[54] PNEUMATIC RUBBER TIRE HAVING CO-CURED, REMOVABLE OR REMOVED INNER LINER

[75] Inventor: Paul H. Sandstrom, Tallmadge, Ohio

[73] Assignee: The Goodyear Tire & Rubber Company, Akron, Ohio

[21] Appl. No.: 293,051

[22] Filed: Aug. 14, 1981

Related U.S. Application Data

[63] Continuation-in-part of Ser. No. 184,856, Sep. 8, 1980, abandoned.

[51] Int. Cl.$^3$ .................. B29H 17/14; B60C 19/12; B32B 31/00
[52] U.S. Cl. .................. 156/123; 156/115; 156/247; 156/289; 152/347; 152/DIG. 16
[58] Field of Search .............. 156/115 R, 123 R, 153, 156/247, 289, 110 R; 152/330 R, DIG. 16, 346–350

[56] References Cited

U.S. PATENT DOCUMENTS 3,136,739  6/1964  Adamek et al. ............. 152/330 R
3,223,134 12/1965  Hofmann ..................... 152/330 R

FOREIGN PATENT DOCUMENTS 49-30279  8/1974  Japan ............................. 156/115

Primary Examiner—Edward C. Kimlin
Assistant Examiner—Lois E. Boland
Attorney, Agent, or Firm—H. C. Young, Jr.

[57] ABSTRACT

A pneumatic rubber tire, and method of preparation, characterized by having a covulcanized, removable, rubber inner liner adhering to the inner surface of the tire, said inner liner comprised of a sulphur cured rubber admixture of (A) butyl rubber and (B) an ethylene/propylene/nonconjugated diene terpolymer. The information further relates to such pneumatic rubber tire in which its exposed inner surface is provided by removal of said inner liner. The information has a particular utility in providing a pneumatic rubber tire with a clean, exposed, inner surface.

1 Claim, 1 Drawing Figure

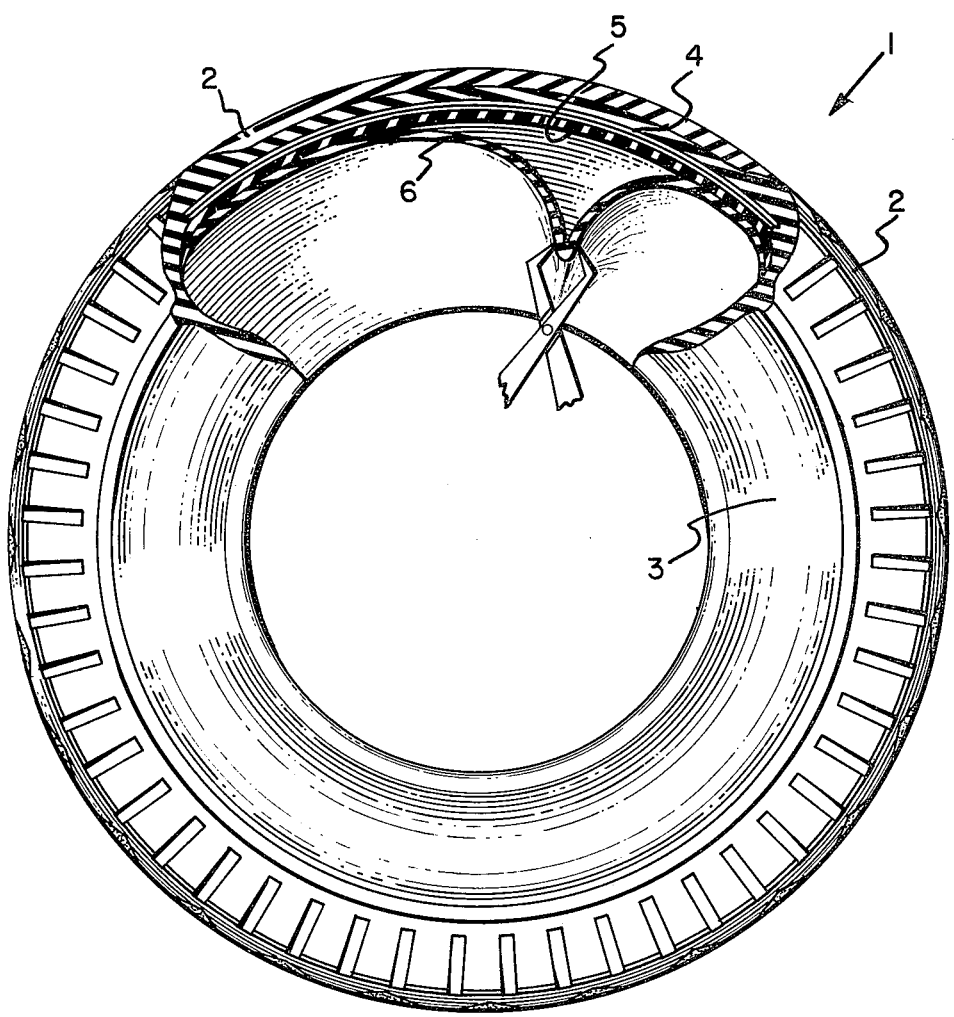

PNEUMATIC RUBBER TIRE HAVING CO-CURED, REMOVABLE OR REMOVED INNER LINER

This application is a continuation in part of application Ser. No. 184,856 filed Sept. 8, 1980, now abandoned.

FIELD OF INVENTION

This invention relates to a pneumatic tire having an adherent, removable, inner liner. The invention further relates to a pneumatic tire having an inner surface formed by the removal of such an adherent, removable, inner liner.

BACKGROUND OF THE INVENTION

Various coatings are sometimes applied to the inner surface of pneumatic tires for various purposes. For example, sealant compositions are sometimes applied to the inner surface of cured pneumatic tires by spray coating or by applying strips of sealant composition.

A difficulty is readily experienced in the application of such inner coatings caused primarily by the manufacturing process for the pneumatic tire itself. For example, after building a greenc unvulcanized tire, its inner surface is conventionally coated with a release material. Such inner release coat is provided for the purpose of preventing the inner surface of the pneumatic tire from sticking to the pneumatic shaping bladder in its molding and curing process.

If it is desired to apply a coating, such as a puncrure sealant, to the inner surface of the cured pneumatic tire, it is normally required that the previously applied inner release coat be removed prior to application of the sealant coat. Otherwise, the application of such sealant coat will normally not effectively adhere to the tire's inner surface because of the presence of the release agent coat. Consequently, the removal of such release agent coat is typically required before the application of such additional coat.

The removal process for the release coat can include a soap-wash, a buffing or abrading of the surface or a combination of such processes. Such processes are additive steps in the preparation of a tire and can add an appreciable cost to the finished tire.

Therefore, it is a purpose of this invention to provide a means for preparing a cured pneumatic rubber tire which has an inner surface to which can conveniently be applied an internal coating such as a sealant.

DISCLOSURE AND PRACTICE OF THE INVENTION

In accordance with this invention, a pneumatic rubber tire is provided comprising a generally toroidal shaped carcass with a circumferential tread, spaced beads and connecting sidewall portions extending between said tread and beads having a sulfur covulcanized, removable, rubber inner liner comprised of a rubber admixture of (A) about 50 to about 100, preferably about 60 to about 90, parts by weight butyl rubber and, correspondingly, (B) about 50 to about 0, preferably about 40 to about 10, parts by weight of an ethylene/propylene/nonconjugated diene terpolymer rubber.

It is understood that the inner liner can also contain conventional rubber compounding ingredients including processing oil, accelerators, conventional sulfur curing agents, pigments, carbon black, zinc oxide, stearic acid, tackifying resin, and plasticizer.

In the practice of this invention, it is required that the said inner liner is covulcanized with the tire in the sense that the uncured rubber strip is built into or as a part of the green, or uncured, tire construction. Thus, in the molding and curing operation for producing the tire, the strip and green tire cure substantially simultaneously.

The practice of this invention is enabled by the cocured composite inner liner having a relatively low adhesion to the inside surface of the tire of less than about 10 lbs. per linear inch (1.8 Kg/linear cm), so that it can conveniently be pulled out by hand or by machine, and a tack value in the range of about 10 to about 30 Newtons so that it will adequately adhere, or stick, to the inside surface of the green tire. It is considered that these co-vulcanized interface properties of the inner liner or strip to the inside surface of the tire are important for this invention.

In further accordance with this invention, such a pneumatic tire is provided having a prepared inner surface provided by the removal of said convulcanized rubber strip or inner liner.

By the term "prepared inner surface", or the inside surface of the tire, it is meant such a surface provided by removal of said co-cured rubber composite strip which does not have the conventional release agent coating and therefore is considered a cleaned, or fresh, exposed surface which is readily available for having other coatings applied thereto without having to first remove the normally present release coat.

In the practice of this invention, the adherent removable, rubber strip, in its uncured state, is simply applied to the building form over which the remainder of the tire is built. The resulting assembly is then coated on its inside surface with a release agent to prevent sticking to the shaping bladder, placed in a tire mold and shaped and cured with the aid of heat and pressure and expanded inner bladder to form the cured tire. The bladder is then deflated, the mold opened and tire removed therefrom and allowed to cool. The covulcanized adherent strip inner liner is then removed from the inside of the tire by hand or by machine to leave the fresh, clean, exposed inner surface of the tire.

Thus, the uncured rubber strip having high green tack but relatively low cured adhesion is simply built on to the tire during its manufacturing process and prior to its shaping and curing step. In this manner, the composite strip is simply cured along with the tire, but because of its poor cured adhesion, the composite strip is not strongly adhered to the inner surface of the rubber tire itself.

The outer release coat applied to the outside of said rubber strip, which will become the releasable tire inner liner is typically of the conventional silicone which can be a mixture of silicone and additives to give it body and other desired properties.

Various puncture sealant compositions can then be successfully applied to the prepared surface of the tire, for example, a sealant composition composed of butyl rubber, polyisobutylene and tackifying agent, as well as various fillers. Such a sealant composition can be conveniently applied directly as a coating to the inside of the tire or as a solution after which the solvent is evaporated. Such a coating can be applied, for example, by spray coating in the case of a solution or by extrusion and lay-up in the case of a non-solution application.

The adherent, removable, composite strip, or inner liner, typically has a thickness in the range of about 0.01 to about 0.1 (0.025–0.25), preferably about 0.02 to about 0.08 (0.05–0.2) inches (cm). After the tire containing the rubber strip on its inner surface has been shaped and cured, the co-cured strip can simply be removed by hand or by manual or automatic device. The rubber sheet can be color-coded with a pigment to contrast with the color of the tire itself so that it can be readily apparent whether it has actually been removed prior to further processing of the tire, such as sealant coat application.

The rubber strip is preferably positioned on the inner portion of the tire in its crown region opposite the tread portion. This is because the prepared inner surface of the tire is generally utilized as a base for coatings or laminates such as, for example, tire puncture sealants.

The butyl rubber for the rubber strip utilized in this invention is generally of the type prepared by polymerizing a mixture of isobutylene and isoprene, with the major portion being isobutylene.

The butyl rubber typically has an average molecular weight in excess of 200,000, preferably in the range of about 200,000 to about 600,000 and even more preferably in the range of about 200,000 to about 400,000.

The vulcanized rubber tire itself can be of various sulfur curable rubbers such as natural rubber and synthetic rubber and their mixtures or blends. For example, it can be at least one of rubbery butadiene/styrene copolymer, butadiene/acrylonitrile copolymer, cis-1,4 polyisoprene (natural or synthetic), polybutadiene, isoprene/butadiene copolymer, butyl rubber, halogenated butyl rubber, such as chloro or bromobutyl rubber, ethylene/propylene copolymer or ethylene/propylene terpolymer (EPDM). Typically the various polymers are cured or vulcanized by normal sulfur curing methods and recipes.

In particular, although other portions of the tire can be of such rubbers, the inside surface of the tire, to which the rubber strip is covulcanized, is typically and preferably comprised of a butyl-type rubber, natural rubber, or mixture thereof. Such butyl-type rubber can conveniently be selected from at least one of butyl rubber or a halobutyl rubber such as chlorobutyl or bromobutyl rubber.

BRIEF DESCRIPTION OF THE DRAWING

The invention can be further understood with respect to the accompanying drawing which is a side elevational view of a shaped, molded and cured rubber pneumatic tire with a cut-away portion showing an adherent, removable, inner rubber strip, or inner liner, adhered to its inner surface in its crown area opposite its tread.

More specifically, on the drawing, a tubeless pneumatic tire 1 is shown having the customary tread portion 2, sidewalls 3 and support member or structure 4 which typically contains rubberized fabric-reinforced plies to back and reinforce the tread and sidewalls portions as well as a butyl rubber inner surface 5 and the adherent, removable, co-cured rubber composite 6 of this invention which has an outer release coat thereon which has remained after the tire molding and curing operation. The rubber composite 6 is shown both adhered to the inner surface of the rubber and as being partially removed by peeling to reveal a prepared and exposed inner surface of the tire.

The practice of this invention is further illustrated by reference to the following examples which are intended to be representative rather than restrictive of the scope of the invention. Unless otherwise indicated, all parts and percentages are by weight.

EXAMPLE I

A tubeless pneumatic, radial ply, steel belted rubber tire was prepared having an inner, covulcanized, removable, adherent rubber strip on its inner surface of the HR78-15 type having a ground contacting tread, spaced beads, connecting sidewalls and supporting carcass structure corresponding generally to that shown in the drawing.

The removable, adherent rubber composite strip was about 8 inches wide and about 0.03 inches thick, circumferentially applied in its uncured state to a building form. Subsequently, the pneumatic tire was built around the form over the strip. After the building of the tire, it was removed from the building form and a silicone containing release coating was applied to the exposed surface of the adherent strip on the inside of the tire. The tire was then placed in a mold and an expandable bladder placed within the tire, the mold closed and the bladder expanded against the release agent coat and heat applied to shape and cure the tire.

The mold was operated and the cured tire removed from the mold.

The adherent, removable, rubber composite strip was removed by hand from the inside of the tire to provide a pneumatic rubber tire having a clean inside surface. The inside surface of the tire was clean in the sense that it was freshly prepared and did not have a conventional release agent coating thereon.

The clean inside surface of the tire was spray-coated with a sealant composition for the purpose of providing a self-sealing against puncturing objects, pneumatic tire. The sealant composition was of the butyl/polyisobutylene/curative (or crosslinker)/solvent based type.

The rubber composite strip, for this example, was prepared according to the following recipe in which the ingredients of Table I-A were mixed in a Banbury mixer and the resultant mixture mixed on a mill with the ingredients of Table I-B.

TABLE I-A

| Compound | Parts |
|---|---|
| Butyl rubber | 70.0 |
| EPDM*1 | 30 |
| Carbon Black (FEF) | 50 |
| Stearic Acid | 1.5 |
| Zinc Oxide | |
| Tackifying Resin*2 | 8.0 |

*1Ethylene/propylene/diene rubber obtained as Nordel 1320, Nordel being a trademark of the DuPont de Nemours, E.I., Co.
*2Hydrocarbon-derived tackifying resin of the diolefin/olefin copolymer type having a softening point in the range of about 94° C. to about 98° C.

TABLE I-B

| Compound | Parts |
|---|---|
| Mercaptobenzothiazole | 1.0 |
| Tetramethylthiuram disulfide | 1.25 |
| Sulfur | 2.0 |

In the practice of this invention, it may be desirable to include a tackifier in the recipe for the rubber composite strip as a building aid during the building of the green tire itself. In this regard, generally about 2 to about 10 parts by weight of resin tackifier for said EPDM and butyl rubbers is used. Suitable tackifiers include terpene resins and synthetic hydrocarbon-derived resins having a softening point in the range from about 50° to about 110° C.

For example, such resins can be prepared by polymerizing hydrocarbon monomers in the presence of the catalyst such as aluminum chloride or boron trifluoride or boron trifluoride etherate. Such monomers, for example, can be a mixture of diolefin and monoolefin hydrocarbons containing from 4–6 carbon atoms. For example, piperylene can be copolymerized with methyl branched α-olefin containing 5–6 carbon atoms.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a pneumatic rubber tire which comprises applying a sulfur-containing uncured butyl rubber strip to a building form over which the remainder of the elements of the rubber pneumatic tire are built thereby providing a sulfur curable rubber interface of the uncured tire with the said strip in the crown region of the tire, following which the resulting assembly is coated on its inside surface with a release agent, the assembly placed in a tire mold and shaped and the tire and said strip covulcanized together to provide cured adhesion between said strip and tire inner surface with the aid of heat and pressure and expanded inner bladder, deflating the bladder and removing the tire from the mold following which the sulfur covulcanized, initially applied, butyl rubber strip is removed from the inside of the tire to provide a resultant pneumatic tire having a fresh, clean, exposed inner surface; where said first applied butyl rubber strip is removed as a covulcanized, sulfur cured rubber admixture comprised of (A) about 60 to about 90 parts by weight butyl rubber and correspondingly, (b) about 40 to about 10 parts by weight of an ethylene/propylene/nonconjugated diene terpolymer and contains about 2 to about 10 parts by weight tackifier resin for said EPDM and butyl rubbers with a softening point in the range of about 50° C. to about 110° C. prepared by polymerizing a mixture of piperylene and at least one methyl branched α-olefin containing 5–6 carbon atoms; where said butyl rubber has a molecular weight in the range of about 200,000 to about 400,000; where said cured rubber strip has a thickness in the range of about 0.025 to about 0.25 cm, and has a covulcanized adhesion to the tire's inner cured rubber surface of less than about 1.8 kg per linear cm and a tack value in the range of about 10 to about 30 Newtons.

* * * * *